United States Patent
Livergood et al.

(10) Patent No.: US 12,184,391 B2
(45) Date of Patent: Dec. 31, 2024

(54) MULTI-BAND SIGNAL COMMUNICATIONS SYSTEM AND METHOD

(71) Applicant: LANDMARK PEGASUS INC., Jupiter, FL (US)

(72) Inventors: George A. Livergood, Rogers, AR (US); John Moroney, Jupiter, FL (US)

( * ) Notice: Subject to any disclaimer, the term of this patent is extended or adjusted under 35 U.S.C. 154(b) by 163 days.

(21) Appl. No.: 17/918,275

(22) PCT Filed: Apr. 12, 2021

(86) PCT No.: PCT/US2021/026915
§ 371 (c)(1),
(2) Date: Oct. 11, 2022

(87) PCT Pub. No.: WO2021/207739
PCT Pub. Date: Oct. 14, 2021

(65) Prior Publication Data
US 2023/0170983 A1 Jun. 1, 2023

Related U.S. Application Data (63) Continuation-in-part of application No. 16/845,566, filed on Apr. 10, 2020, now abandoned.

(51) Int. Cl.
*H04B 7/185* (2006.01)
*H04B 7/195* (2006.01)

(52) U.S. Cl.
CPC ..... *H04B 7/18513* (2013.01); *H04B 7/18515* (2013.01); *H04B 7/18517* (2013.01);
(Continued)

(58) Field of Classification Search
CPC ............ H04B 7/18513; H04B 7/18515; H04B 7/18517; H04B 7/18521; H04B 7/18543; H04B 7/18582; H04B 7/195; Y02D 30/70
See application file for complete search history.

(56) References Cited

U.S. PATENT DOCUMENTS 4,740,795 A   4/1988  Seavey
4,785,306 A   11/1988 Adams
(Continued)

FOREIGN PATENT DOCUMENTS

CN   110995334 A  *  4/2020  ........... H04B 7/1851
WO   WO-2017017098 A1 * 2/2017  ............. H01Q 1/288

OTHER PUBLICATIONS

Gagliardi, R.M. (1991). Frequency-Hopped Communications. In: Satellite Communications. Springer, Dordrecht. https://doi.org/10.1007/978-94-010-9760-4_8 (Year: 1991).*

(Continued)

*Primary Examiner* — Shah M Rahman
(74) *Attorney, Agent, or Firm* — Law Office of Mark Brown, LLC; Mark E. Brown (57) ABSTRACT

A multi-band signal communications system includes a hub station communicating with multiple remote stations. The system reduces or eliminates the effects of precipitation, airborne pollutants, dust and debris. Signals can comprise digital or analog signals, which can be encrypted. The system can utilize binary digital or quantum computing technologies. The system can utilize frequency-hopping and satellite-hopping routines for security. System components can be fabricated from silicone-based semiconductors and graphene. System functions can be implemented with hardware, firmware and software. The communications system and method can be implemented with fiber-optic cables, laser transmissions and microwave-frequency media.

3 Claims, 6 Drawing Sheets

(52) U.S. Cl.
CPC ..... *H04B 7/18521* (2013.01); *H04B 7/18543* (2013.01); *H04B 7/18582* (2013.01); *H04B 7/195* (2013.01)

(56) References Cited

U.S. PATENT DOCUMENTS

| | | | |
|---|---|---|---|
| 5,019,910 | A | 5/1991 | Filmer |
| 5,619,525 | A | 4/1997 | Wiedeman et al. |
| 5,745,084 | A | 4/1998 | Lusignan |
| 5,751,247 | A * | 5/1998 | Nomoto ............. H04B 7/18517 342/359 |
| 6,067,453 | A | 5/2000 | Adiwoso et al. |
| 6,141,534 | A | 10/2000 | Snell et al. |
| 6,212,360 | B1 | 4/2001 | Flemming, III et al. |
| 6,256,496 | B1 | 7/2001 | Dintelmann et al. |
| 6,301,232 | B1 | 10/2001 | Dutta |
| 6,748,215 | B1 * | 6/2004 | Chen ................ H04W 36/0088 455/67.11 |
| 7,505,736 | B2 | 3/2009 | Min |
| 7,590,083 | B2 | 9/2009 | Haugli |
| 7,653,348 | B2 | 1/2010 | Karabinis |
| 11,070,282 | B2 * | 7/2021 | Dankberg ............. H01Q 1/288 |
| 2002/0167918 | A1 | 11/2002 | Brewer |
| 2006/0072567 | A1 * | 4/2006 | Casaccia ................ H04B 1/713 370/328 |
| 2007/0069970 | A1 | 3/2007 | Argaman et al. |
| 2008/0090516 | A1 | 4/2008 | Thomas et al. |
| 2009/0081945 | A1 * | 3/2009 | Courseille .......... H04B 7/18536 455/3.02 |
| 2009/0164121 | A1 | 6/2009 | Chen et al. |
| 2009/0180421 | A1 | 7/2009 | Hall et al. |
| 2010/0220585 | A1 | 9/2010 | Poulson et al. |
| 2015/0237587 | A1 | 8/2015 | Livergood |
| 2017/0288769 | A1 | 10/2017 | Miller et al. |
| 2018/0132061 | A1 | 5/2018 | Bitra et al. |
| 2018/0343055 | A1 * | 11/2018 | Olson ..................... B64G 1/10 |
| 2020/0044731 | A1 | 2/2020 | Tsuzaki et al. |
| 2020/0393569 | A1 * | 12/2020 | Fernàndez-Hernàndez ................. G01S 19/01 |
| 2021/0282201 | A1 * | 9/2021 | Shi ......... H04W 80/02 |
| 2023/0223733 | A1 * | 7/2023 | Carrascoso ........... H01S 3/1686 359/298 |
| 2023/0362173 | A1 * | 11/2023 | Dalton ................ H04W 12/121 |

OTHER PUBLICATIONS

"IDirect Techonologies Broadband VSAT System Summary", Product Brochure, iDirect, 13865 Sunrise Valley Dr, Herndon, AV, 2017, www.idirect.net, Feb. 2008.
"International Search Report and Written Opinion, PCT/US2021/026915".

* cited by examiner

MULTI-BAND SIGNAL COMMUNICATIONS SYSTEM AND METHOD

PRIORITY CLAIM AND CROSS-REFERENCE TO RELATED APPLICATIONS

This application claims priority in International Application No. PCT/US2021/026915, filed Apr. 12, 2021, which is a continuation in part of U.S. patent application Ser. No. 16/845,566, filed Apr. 10, 2020 and is related to U.S. Pat. No. 9,026,106, issued May 5, 2015, and U.S. Pat. No. 9,648,568, issued May 9, 2017.

BACKGROUND OF THE INVENTION

1. Field of the Invention

The present invention relates generally to communications systems and, more particularly, to a multi-band signal communications system and method.

2. Description of the Related Art

Modern telecommunication systems provide means for communicating vocal conversations, text messages, email, and various kinds of data from originating sources to destinations. The signal transmission media include: twisted pair landlines; coaxial cables; fiber optic cables; radio frequency (RF), laser and microwave communication links. Satellite communications have become an important mode of communications for large and small entities for both one-way services, such as television signals, and two-way services such as data processing services, satellite internet services, and the like. Two-way communication satellite services are typically set up as a head-end or hub station which is interfaced to a large-scale communications network, such as the Internet or any private data network infrastructure, and remote stations which communicate through a communication satellite to the hub station and through the hub station to a data network. Data networks can provide telephone and other communication services over dedicated lines, the Internet and other links. Equipment for remote satellite stations has evolved to what are known as very small aperture terminal (VSAT) satellite dishes.

The present standard for VSAT satellite communications is the use of available higher frequency bands for satellite technology in order to use meter or sub-meter sized satellite antennas and to avoid costly licensing and frequency coordination. A problem with higher frequency bands with satellite technology is that they tend to be highly susceptible to local rain or weather fade due to the nature of the frequencies used. For this reason, networks have to be tolerant of frequent signal fades or outages during the presence of rain, snow, airborne particulates (including without limitation, smoke, dust, precipitation and pollutants) and storm clouds. This occurs in all higher frequency band transmissions whether it is for residential satellite television or VSATs.

Some networks attempt to mitigate the fade through the use of automatic uplink power control at the customer VSAT location. This technology gradually increases the transmit power at the remote customer location via a command from the hub location when the hub location senses that there is attenuation somewhere in the path between the remote location and the hub. This works some of the time quite well, but the same local weather anomaly that causes the problem with the inbound signal to the hub also creates a problem with the outbound power control signal to the remote site. Eventually, the control signal cannot reach the remote site electronics with sufficient strength and the remote site shuts down until it can receive a valid command.

This drastically reduces reliability and, as a result, the higher frequency band networks are generally designed to be out of service for about 50 hours per year due to weather. For government, business and customer applications that need to know weather and other critical information, these 50 hours of downtime can be a significant problem.

Fiber optic cable, laser and microwave systems encounter similar problems, which can be effectively managed by the system and methodology of the present invention. Moreover, it is anticipated that additional signal transmission media could benefit from the performance improvements enabled by the present invention.

Heretofore there has not been available a multi-band communications system and method with the features and elements of the present invention.

SUMMARY OF THE INVENTION

The present invention provides a multi-band communications system and method. By way of nonlimiting example, the system can include a hybrid satellite communication system in which a hub station transmits signals to remote stations through a satellite at a relatively lower frequency which is unaffected by weather effects and in which the remote stations transmit signals to the hub station at a relatively higher frequency which enables the use of more economical equipment at the remote stations. The hub station senses the signal quality or strength received from each remote station and transmits power control signals to remote stations with poor signal strengths to cause such remote stations to increase their output power to overcome weather effects. The power control signals are transmitted on the lower frequency to prevent weather effects from masking the power control signals.

An embodiment of the present invention provides a technique to send the outbound signals from the hub at a much lower frequency band (e.g., C band at 4 to 8 GHz, or lowest available) that is virtually unaffected by weather via the same satellite that is receiving a higher frequency band signal from the remote site. As a consequence, the remote site would rarely, if ever, lose its control signal and is always changing its power in response to weather effects to thereby eliminate outages. This requires judicious selection of satellite transponders, special antennas, and specially designed feeds that allow simultaneous transmission of a high band frequency band while receiving a lower band frequency. Generally, the lower frequency (e.g., C band) signals are used for band management and system control due to their resistance to weather-related interference, whereas the higher frequency (e.g., Ku or Ka band) signals are used for data transfer. An embodiment of the present invention provides a hybrid satellite antenna for a remote station to enable the remote station to transmit and receive signals on different bands using a single antenna assembly.

An embodiment of the present invention employs an antenna configuration enabling the use of a reduced size dish without causing interference effects by receiving signals from or transmitting signals to multiple satellites.

Other embodiments utilize frequency-hopping, satellite-hopping, signal encryption and quantum computing technology. In further embodiments, the invention is implemented in networks and systems utilizing fiber-optic cables, lasers and microwave media.

Various objects and advantages of the present invention will become apparent from the following description taken in conjunction with the accompanying drawings wherein are set forth, by way of illustration and example, certain embodiments of this invention.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Such technologies can be implemented with software, hardware and firmware. Hardware and firmware can be configured with various technologies, such as printed circuit boards (PCBs). Semiconductor technology, utilizing silicon and other materials, can be utilized. Graphene-based technology can also be utilized.

Said terminology will include the words specifically mentioned, derivatives thereof and words of similar meaning.

II. Hybrid Dual-Band Satellite Communication System 1

Figure 1:
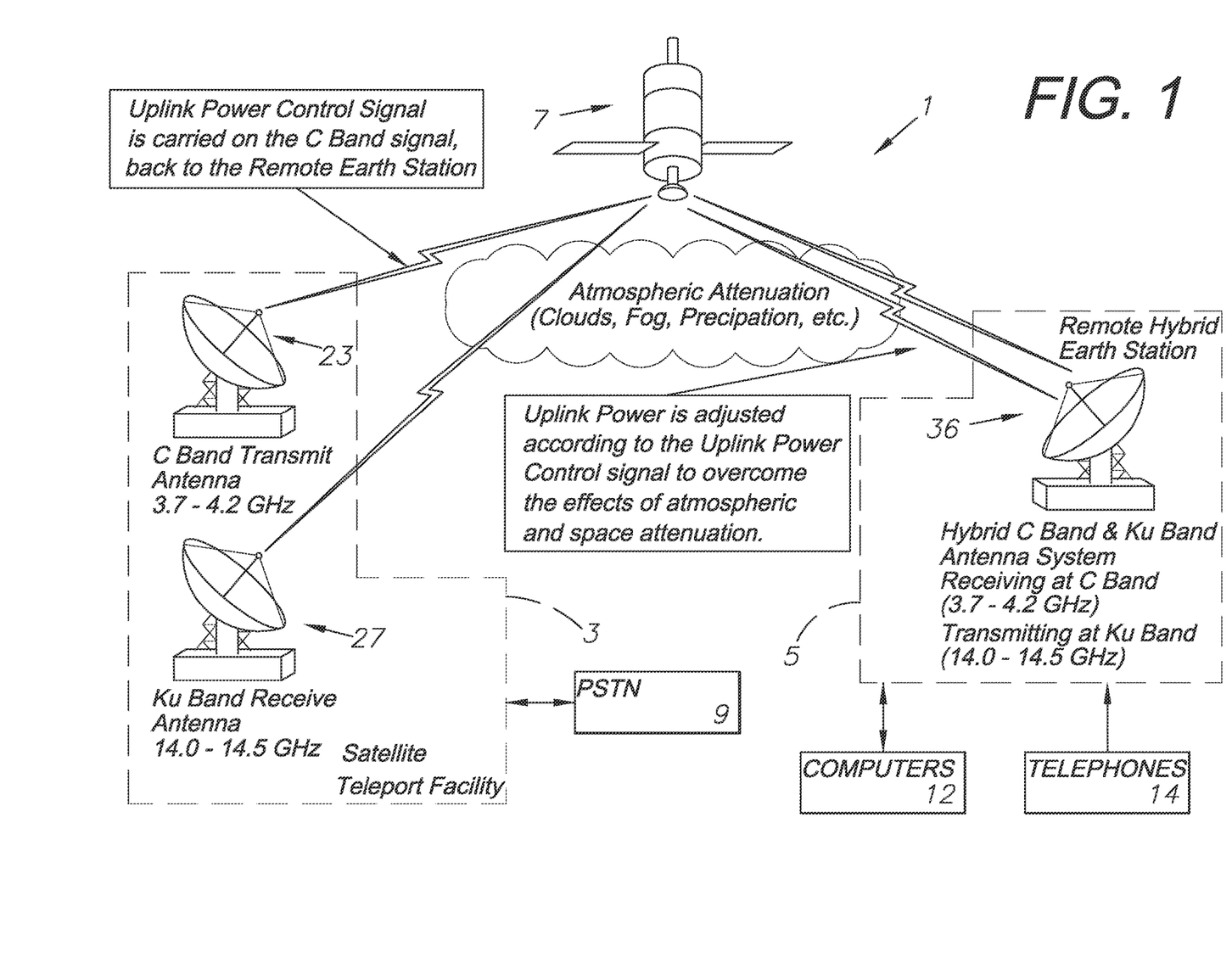
FIG. 1 is a diagrammatic view illustrating an embodiment of a hybrid high and low band satellite communication system.

Referring to the drawings in more detail, the reference numeral 1 generally designates an embodiment of a hybrid high and low band satellite communication system according to the present invention. The illustrated system 1 generally includes a satellite teleport facility or hub station 3 which communicates with a plurality of remote stations 5 by means of a geostationary communication satellite 7. The hub station 3 is interfaced to a large-scale communication network, such as a typical IP data Network or Internet connectivity 9 which can provide voice and data communication services. The remote stations 5 include communication devices, such as computers 12 and telephones 14, which communicate with the network infrastructure 9 by way of the system 1.

Figure 2:
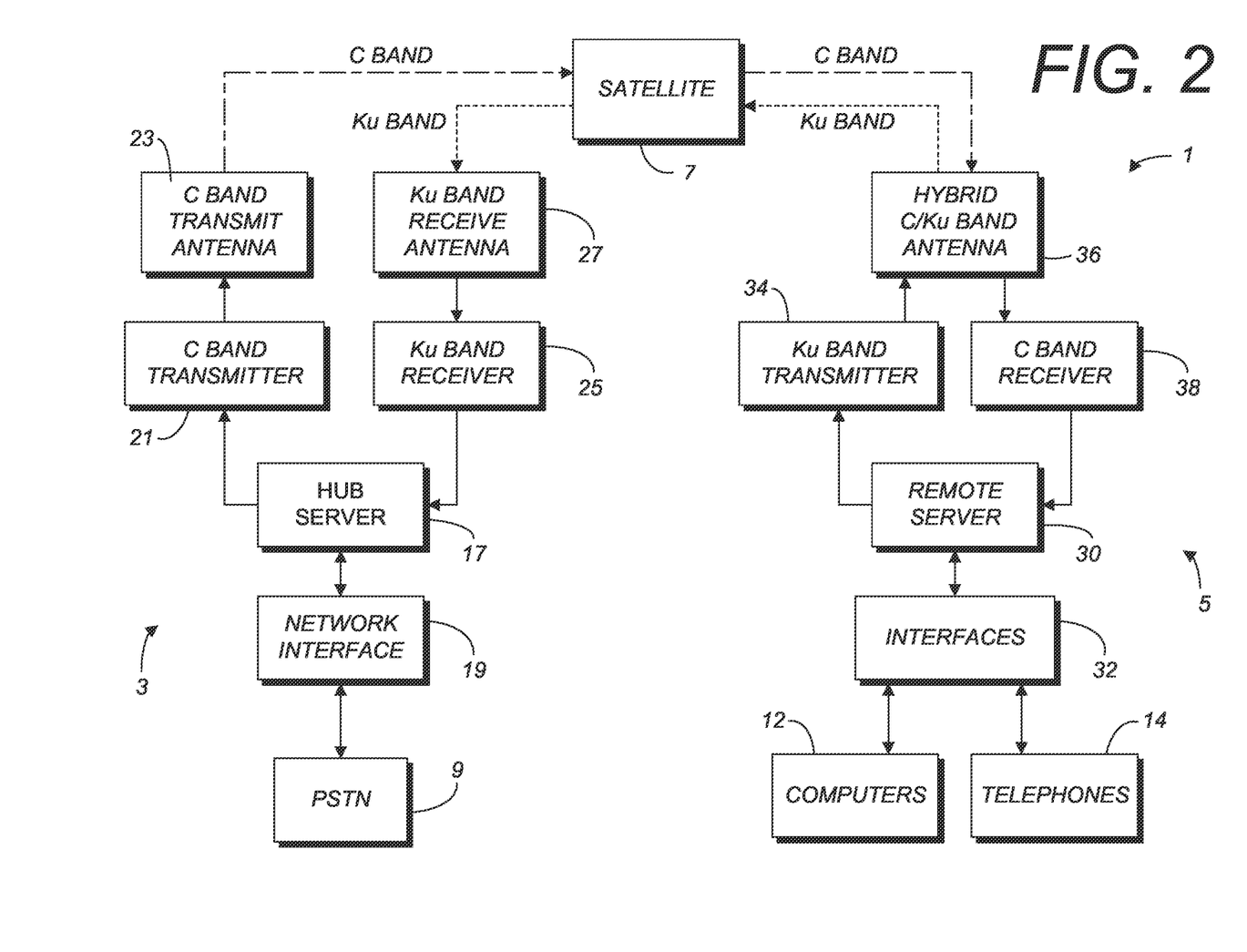
FIG. 2 is a block diagram illustrating components of an embodiment of the present invention.

Referring to FIGS. 1 and 2, the illustrated hub station 3 includes a hub server 17 which is a processor or computer that controls the flow of data through the hub station 3. The hub server 17 includes network interface circuitry 19 which interfaces the hub server 17 to a data network 9. The illustrated hub station 3 includes a low band transmitter 21 which receives data from the hub server 17 and transmits the data through a low band antenna 23 to the satellite 7 on a low band frequency in the range normally between 3.7 to 4.2 GHz but could be lower if lower frequencies become available. The hub station 3 includes a higher band receiver 25 which receives data from a higher band antenna 27 from the satellite 7 on a high band frequency in the range, as illustrated, of about 14 to 14.5 GHz or any other higher frequency that is available. The transmitter 21 and receiver 25 are interfaced to the hub server 17.

Each remote station 5 includes a remote server 30 which is a processor or computer that controls the flow of data through the remote station 5. The remote station 5 includes interface circuitry 32 to interface the remote server 30 to the computers 12 and telephone sets 14 communicating therewith. The illustrated remote server 30 outputs data to the satellite 7 through a higher band transmitter 34 and a hybrid low/high band antenna 36 on the same high band frequency range as the hub receiver 25 and receives data from the satellite 7 through the hybrid antenna 36 through a low band receiver 38 on the same low band frequency range as the hub transmitter 21. The use of the hybrid antenna 36 economizes the implementation of the remote station 5 as far as the purchase and mounting of an antenna and wiring therefor.

Generally, lower frequency transmissions are used for control functions, such as band management, because they are less susceptible to static and other interference, which can be weather-related. The higher frequency components are generally used for data reception and transmission. The components and their respective frequency bands in the dual-band satellite communications system 1 embodying the present invention are preferably selected for optimal performance and cost-effectiveness.

The illustrated satellite 7 shown in FIG. 1 carries a plurality of low band and high band transponders (not shown). The transmission of signals from the hub station 3 and the satellite 7 on low band frequencies assures that such signals will reach the remote station 5, since the low band range of frequencies are virtually immune to deterioration from weather effects. The hub server 17 monitors the signal quality of the high band signals received from the remote stations 5. The output power of the remote high band transmitter 34 can be controlled by the remote server 30 to increase or decrease as needed to provide reliable signal quality from the remote station 5 to the satellite 7 and from there to the hub station 3. The hub server 17 can control a remote server 30 to increase the output power of its transmitter 34 by an uplink power control UPC signal to overcome deterioration or fade of the signal from the remote station 5 due to weather effects. The UPC signal is sent at the low band frequency range to assure that it is received by the remote station 5.

A geostationary satellite 7 is a satellite which has an orbital period equal to the Earth's rotational period (one sidereal day), and thus appears motionless, at a fixed position in the sky, to ground observers. A geostationary orbit can be achieved, for example, by locating a satellite at an altitude of approximately 35,786 km (22,236 mi) above the surface of the earth and directly above the equator. Alternatively, low Earth orbit (LEO) satellites can be utilized. Medium Earth orbit (MEO). Satellites can also be utilized. Communications satellites and weather satellites are often given geostationary orbits so that the ground antennas that communicate with them do not have to move to track them and can be pointed permanently at the position in the sky where they stay. Because of efforts to maximize the coverage of geostationary satellites, there tend to be clusters of closely-spaced satellites positioned over the equator to serve national or continental areas, such as the North American continent from coast-to-coast. However, there is a limit to how closely satellites can be spaced to avoid interference issues when using economical sized antenna dishes on the ground. Currently, the minimum spacing is about two degrees of arc.

Smaller sized dishes tend to be more economical than larger dishes and require less rugged mounting structure. However, smaller dishes have larger beam angles than larger dishes. The larger beam angle of a small dish may receive signals from two or more adjacent satellites and transmit signals to two or more satellites. The reception of signals from multiple sources either at the satellite or ground station may be interpreted as interference and cause undesired effects.

Figure 3:
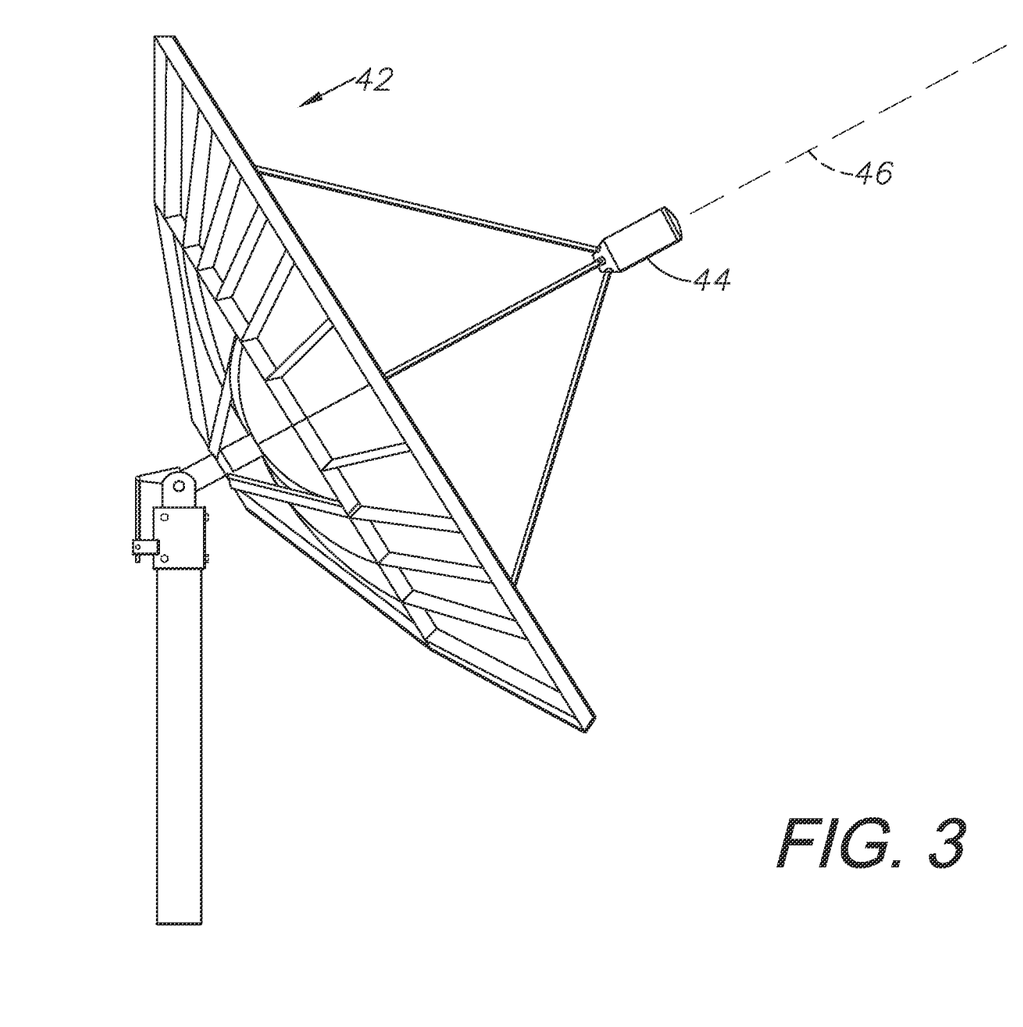
FIG. 3 is a side elevational view of an axial feed antenna dish which may be employed in an embodiment of the present invention. Alternatively, physical array antennae and other antennae configurations can be employed.

Referring to FIG. 3, a common type of dish for communicating with satellites is an axial feed dish 42 which has a feed assembly 44 located along the axis 46 of the dish 42. Typically, the dish 42 is oriented to intersect the axis 46 thereof with the satellite with which it is intended to communicate. However, axial feed dish antennae, such as the antenna 42, tend to be susceptible to transmitting to or receiving from multiple satellites if the size is reduced below a certain diameter. Thus, an axial feed dish such as the dish 42 must be sized large enough to control its beam angle.

Figure 4:
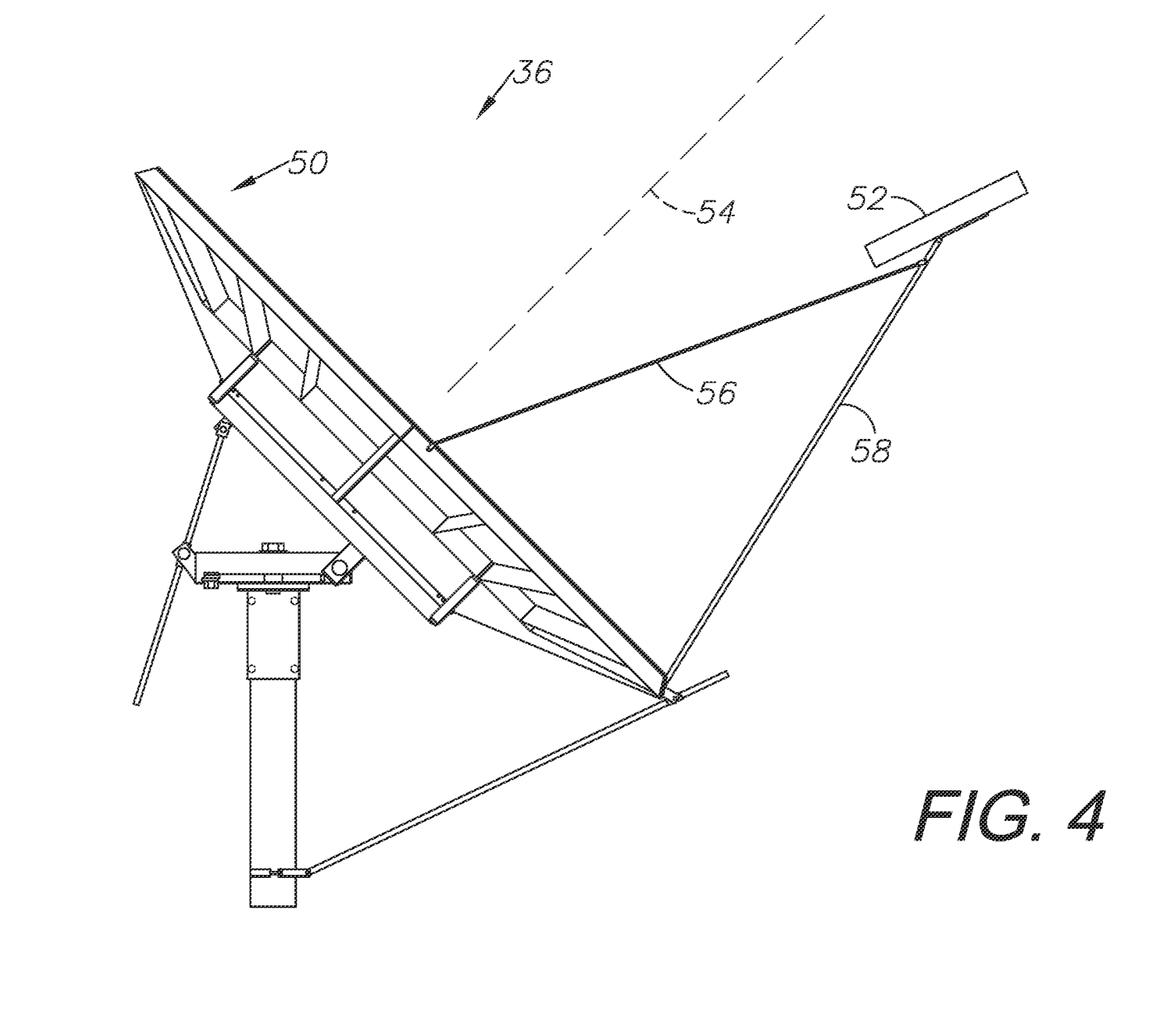
FIG. 4 is a side elevational view of an offset feed, antenna dish which may be employed in an embodiment of the present invention.

Referring to FIG. 4, an embodiment of the system 1 employs an offset dish 50, or the like, as the hybrid antenna 36. The dish 50 has a feed assembly 52 located at an angle which is offset from the axis 54 thereof. The illustrated dish 50 is nominally a 2.4-meter dish and is appropriate for use on both low band and higher band frequencies, however, other antennas can be used. The dish 50 is referred to as a clear aperture type dish because the offset feed assembly 52 does not block energy reflected from the dish surface, as can occur with an axial feed dish 42. By way of non-limiting example, the dish 50 may be implemented as a 2.4-meter Model 1244 or 1251 dish manufactured by Prodelin Corporation (www.prodelin.com). Alternatively, other types of dishes may be used, such as the 3.8-meter Model 1383, also manufactured by Prodelin, as well as dish antennae from other sources. The feed assembly 52 is a dual band feed assembly which is designed to receive in a lower band frequency range and transmit in a higher band range. The feed assembly 52 may be implemented as a Prodelin Model 0800-4487-1 or the like. The illustrated feed assembly 52 is supported by struts 56 and 58 in spaced and angled relation to the surface of the dish 50 to radiate radio frequency energy toward the dish 50 or to receive energy reflected from the dish 50. Although specific antenna models are described, there are many other variants of dishes or antennas that can be used to have the same desired effect.

Because the feed assembly 52 is angularly offset from the axis 54, aiming of the dish 50 toward the satellite 7 is complicated somewhat, since the surface of the dish 50 must be angled in such a manner as to reflect the signal energy from the satellite toward the feed assembly 52 and from the feed assembly 52 toward the satellite. However, the offset feed dish 50 can be used to reduce the multiple satellite interference effect of the beam width thereof, such that a smaller size dish can be used than would otherwise be possible.

While the system 1 has been described using lower band frequencies from the hub station 3 to the remote stations 5 and higher band frequencies from the remote stations 5 back to the hub 3, it is foreseen that other sets of bands could be employed, such as typical higher band frequencies such as Ku or Ka band frequencies from the remote stations 5 to the hub station 3.

Figure 5:
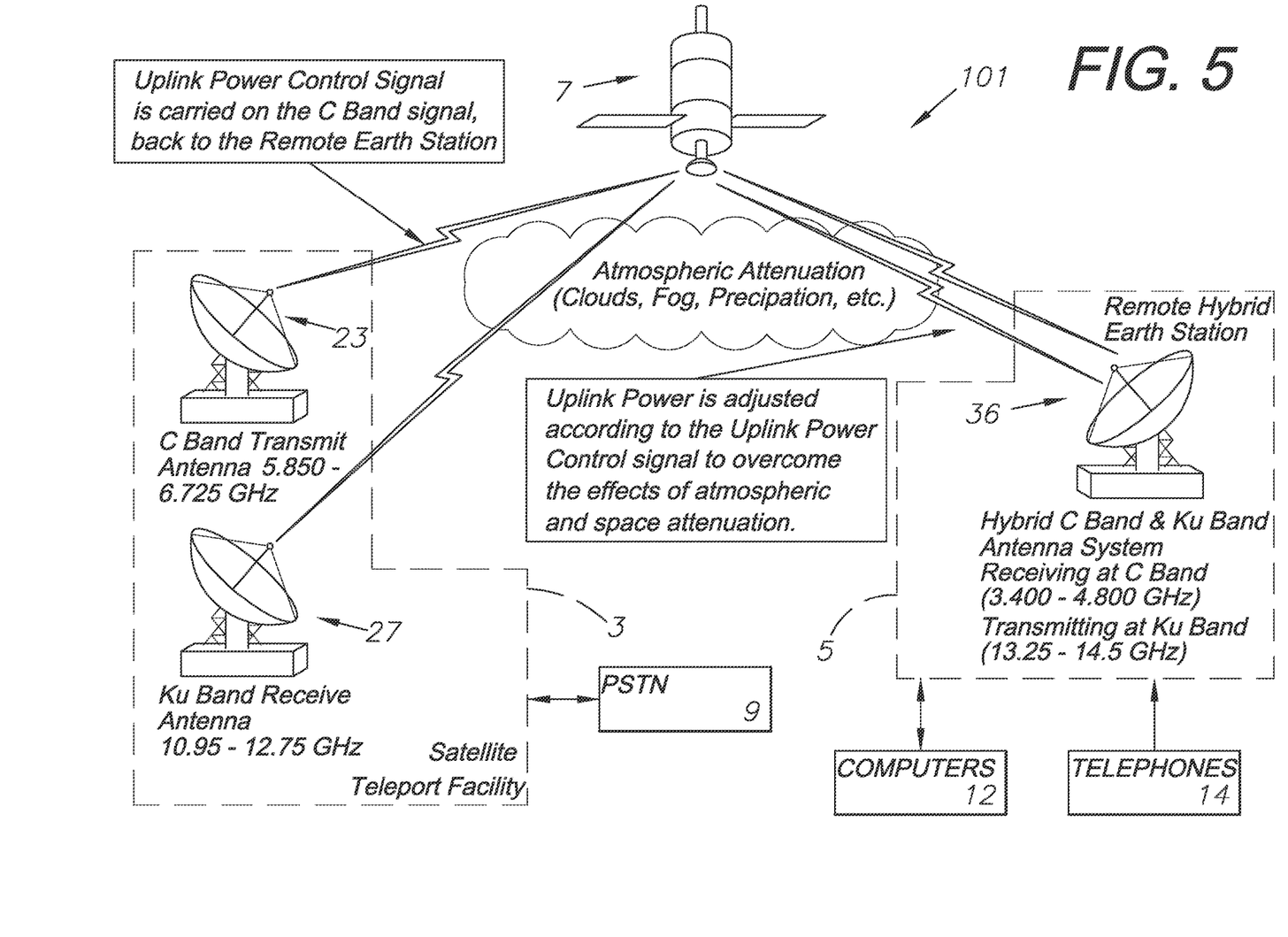
FIG. 5 is a schematic diagram of a hybrid high and low frequency band satellite communication system comprising a first modified embodiment of the present invention.

FIG. 5 shows a hybrid, dual-band satellite communication system 101 comprising a first modified embodiment of the present invention. The system 101 can operate at any suitable frequencies, including low band frequencies such as C band and Ku or Ka band frequencies. Without limitation, examples of extended frequency ranges for different models of block up converters (BUCs) and low-noise block converters (LNBs) for the system 101 are as follows:

TABLE 1

Ku or Ka-Band Variations

| | Transmit Frequency (GHz) | Receive Frequency (GHz) |
|---|---|---|
| Extended Ku-Band | 13.25-14.5 | 10.95-12.75 |
| Extended Ka Band | 29.5-30 | 19.2-20.2 |
| Any future Band Made available by FCC | | |

TABLE 2

C-Band Variations

| | Transmit Frequency (GHz) | Receive Frequency (GHz) |
|---|---|---|
| Extended C-Band | 5.850-6.725 | 3.400-4.800 |
| Any future band made available by FCC | | |

Moreover, the antennas can comprise 3.8 m Prodelin antennas, e.g. Model No. 1241 and Model No. 1385. A variety of other antenna sizes and configurations can be used with the systems of the present invention. Without limitation, typical antenna dish sizes can range from about 1.5 m to about 4.6 m. For example, the systems of the present invention can use a separate higher frequency band uplink with a lower frequency band downlink.

Figure 6:
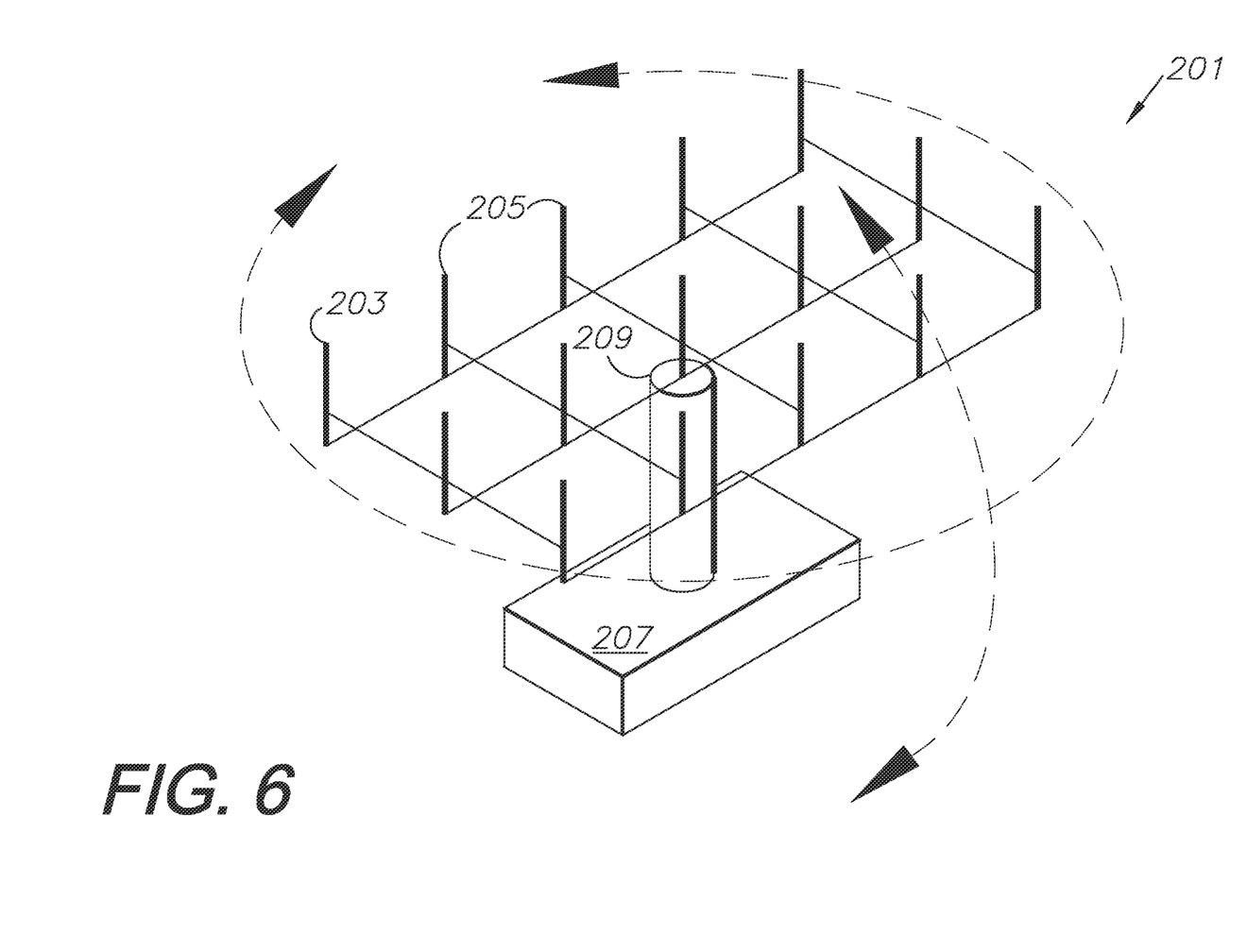
FIG. 6 is a perspective view of an antenna array (or array antenna), which can be utilized with the present invention in place of parabolic dish antennae.

FIG. 6 shows an antenna array (or array antenna) assembly 201, which can be substituted for the parabolic dish antennae shown in FIGS. 1-5 and described above. The antenna array 201 comprises an array 203 of multiple, interconnected antenna elements 205, which collectively function as a single antenna for transmitting and receiving RF signals. The array is mounted on a base 207 by an articulated, variable-orientation mechanism 209, which enables automatically or manually orienting and aiming the array 203. For example, the array 203 can be oriented for optimal reception from or transmission to a geosynchronous satellite or another antenna assembly or assemblies. Moreover, the invention can utilize various types of antenna arrays, including, without limitation, driven, parasitic, phased, electronically-scanned, and other antenna array types.

III. Alternative Embodiments

The system can be embodied in other configurations. Without limitation, these include analyzing distorted incoming signals and determining appropriate procedures for optimizing transmission and reception efficiencies and security. For example, the transmissions can "frequency-hop" for security purposes. Moreover, the signals can utilize multiple satellites for "satellite-hopping." For example, a pilot signal can be transmitted indicating a sequence of frequencies and/or satellites for a transmitted message signal. A control signal for frequency and/or satellite hopping can be transmitted on an outbound signal from a hub and the computer controlled by a random number generating software routine.

Still further, various encryption techniques and processes can be utilized for security purposes. Moreover, conventional digital (binary) technologies and quantum computing technologies can be employed with the present invention.

It is to be understood that the invention can be embodied in various forms and is not to be limited to the examples discussed above. The range of components and configurations which can be utilized in the practice of the present invention is virtually unlimited. For example, various types of antennae can be utilized, and can accommodate different signal frequency bandwidths. Antenna configurations including, parabolic, non-parabolic, phased array and "Simulsat" and mixed combinations thereof can be utilized. Such antennae can receive signals from multiple satellites simultaneously. The present invention can accommodate a wide variety of signal band frequencies.

Signal attenuation and distortion can be caused by precipitation and airborne particles, including pollutants, dust, and debris. Debris can originate from satellite collisions with other satellites and debris. The "Kessler effect" refers to exponentially increasing amounts of debris from such collisions, which can create a cascading effect. Precipitation and airborne particles are factors in satellite signal attenuation and can reflect transmitted signals, thus compromising signal reception quality and integrity. The present invention can reduce the adverse consequences while optimizing signal transmission and reception.

Having thus described the invention, what is claimed as new and desired to be secured by Letters Patent is:

1. A multi-band communications system comprising:
    a hub station including a hub transmitter operating on a first band frequency, a hub receiver operating on a second band frequency, and a hub server;
    a plurality of remote stations each including a remote server having a processor, a remote transmitter operating on said second band frequency, a remote receiver operating on said first band frequency, and a hybrid antenna configured for operating on both said first and second band frequencies;
    a communications link between said hub station and said remote stations;
    said communications link configured to receive and transmit signals;
    said communications link including multiple satellites and configured for transmitting and receiving a message to and from multiple said satellites sequentially;
    said communications link is configured for transmitting a pilot signal with satellite information;
    said communications link configured for transmitting and receiving messages on said communications link is configured for transmitting a pilot signal with frequency information and is configured for sequentially shifting transmissions among multiple said frequencies; and
    said communications link configured for frequency hopping and satellite hopping simultaneously according to a random number generator and indicated by a control signal from said hub station.

2. The communications system according to claim 1 wherein said hub station and said remote stations each includes a phased array antenna configured for receiving and transmitting said signals.

3. The communications system according to claim 2 wherein said phased array antennae are rotatably mounted for pivotal movement with respect to vertical and horizontal axes whereby signal reception and transmission are optimized.

* * * * *